United States Patent [19]
Moreton

[11] 3,993,980
[45] Nov. 23, 1976

[54] SYSTEM FOR HARD WIRING INFORMATION INTO INTEGRATED CIRCUIT ELEMENTS

[75] Inventor: Derek Vidion Moreton, Alsager, England

[73] Assignee: International Computers Limited, Stevenage, England

[22] Filed: Dec. 12, 1974

[21] Appl. No.: 532,056

[30] Foreign Application Priority Data
Dec. 14, 1973 United Kingdom............... 59310/73

[52] U.S. Cl. .......................................... 340/172.5
[51] Int. Cl.[2] ......................................... G06F 9/20
[58] Field of Search................. 340/172.5; 307/238, 307/239, 241

[56] References Cited
UNITED STATES PATENTS

| | | |
|---|---|---|
| 3,094,610 | 6/1963 | Humphrey, Jr. et al. ........ 340/172.5 |
| 3,242,467 | 3/1966 | Lamy................. 340/172.5 |
| 3,274,561 | 9/1966 | Hallman et al. ................ 340/172.5 |
| 3,470,542 | 9/1969 | Trantanella................ 340/172.5 X |
| 3,753,238 | 8/1973 | Tutelman....................... 340/172.5 |

*Primary Examiner*—Gareth D. Shaw
*Assistant Examiner*—Melvin B. Chapnick
*Attorney, Agent, or Firm*—George R. Douglas, Jr.

[57] ABSTRACT

A system for hard wiring information into large scale integrated circuit elements, in which a waveform generator produces a plurality of fixed patterns each representing a portion of the information it is required to hard-wire into a particular element. The wired-in information may be used in uniquely identifying the individual circuit elements. Each element has at least two terminals to which a portion of the information is applied by connecting the terminals to various combinations of lines of a group of distribution lines to which the waveforms are applied. The terminals of the circuit elements each receive a plurality of bits of the wired-in information.

5 Claims, 5 Drawing Figures

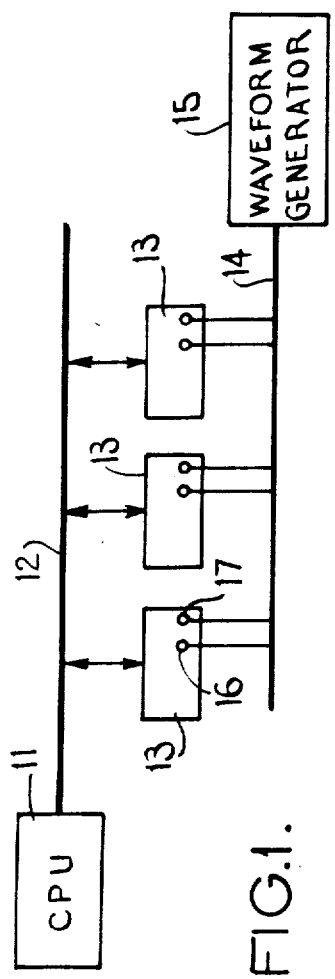
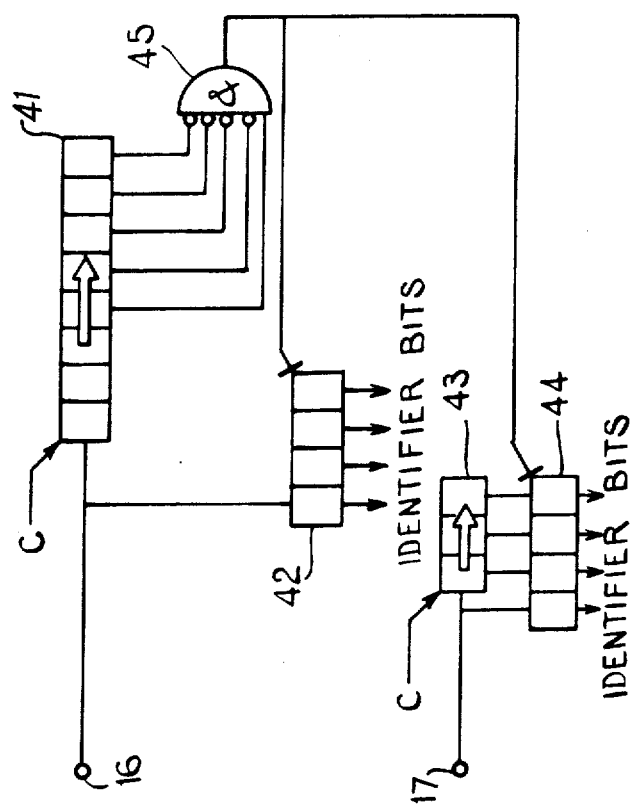
FIG.1.
FIG.4.

SYSTEM FOR HARD WIRING INFORMATION INTO INTEGRATED CIRCUIT ELEMENTS

BACKGROUND OF THE INVENTION

This invention relates to systems for hard wiring information into integrated circuit elements and in particular to such systems when utilised in data processing apparatus using large scale integrated circuit (LSI) chips or elements.

In data processing apparatus which includes a number of such chips it is often necessary to hard wire certain information into the chips by making selected external connections to the chips. For example, in a system including a number of identical memory chips, each chip may be provided with a unique identifying address by hard wiring predetermined numbers into the units. In known systems, hard wiring-in of information has been performed by providing each chip with a number of terminals, one for each bit of information which is to be hard wired-in. Each of these terminals is connected selectively either to a D.C. voltage source representing the binary digit "1", or to a D.C. voltage source representing the digit "0". Thus, for example, if an eight-bit address is to be hard wired into a chip, the chip must be provided with eight terminals specifically for this purpose.

This technique uses a large number of terminals, which is a disadvantage for an LSI chip, since the cost of the chip increases steeply as the number of terminals on the chip increases.

SUMMARY OF INVENTION

An object of the present invention is to provide a hard wiring system for large scale integrated circuit elements which is suitable for use with digital data processing apparatus which comprises a plurality of LSI chips in which information can be wired into the units in a novel manner which requires fewer terminals on each unit than the method described above.

This invention provides hard-wiring system for large scale integrated circuit elements, the system including digital data-processing having a plurality of distribution lines; means for producing a different waveform on each of the distribution lines, each waveform representing a group of digits; and a plurality of large scale integrated circuit chips, each chip having at least one terminal which is wired to a selected one of the distribution lines so as to receive the waveform on that line and deriving means arranged to derive from the or each waveform so received the group of digits represented by that waveform.

Thus, in a system in accordance with the invention, each terminal will receive a plurality of digits, compared with the known arrangement in which each terminal receives only one digit. Hence, the number of terminals on the chip can be correspondingly reduced.

In a particular form of the invention, the digits derived by each chip represent an identifying address for that chip, and each chip includes comparator means for comparing these digits with an incoming address transmitted to all the chips so as to detect correspondence between said incoming address and the derived digits.

The deriving means may comprise a shift register for storing at least a part of the waveform received by the terminal, a buffer register and means for asembling in the buffer register, at least partly by transfer from the shift register, the group of digits represented by the waveform.

Each waveform may include a synchronisation pattern common to all the waveforms, the deriving means being arranged to detect the synchronisation pattern and in response thereto to derive from the or each waveform received by the chip the group of digits represented by that waveform. With the shift and buffer register arrangement described above the deriving means may then be arranged to detect the presence of the synchronisation pattern in a predetermined position in the shift register.

BRIEF DESCRIPTION OF THE DRAWINGS

One form of hard wired system as associated with a data processing apparatus and constructed in accordance with the invention will now be described, by way of example, with reference to the accompanying drawings of which:

FIG. 1 is a schematic block diagram of the system;

FIG. 4 is a logic circuit diagram of a waveform decoder forming part of the system.

DESCRIPTION OF THE PREFERRED EMBODIMENT

Referring to FIG. 1, illustrates a portion of a data processing apparatus including a central processing unit (CPU) 11, connected to a multi-wire highway 12, to which are connected a plurality of functional units 13 (e.g. memory units, or input/output devices). Each of the units 13 consists of a single LSI chip, fabricated by known methods.

Each of the units 13 is given a unique eight-bit identifying address to distinguish it from the other units 13.

Figure 5:
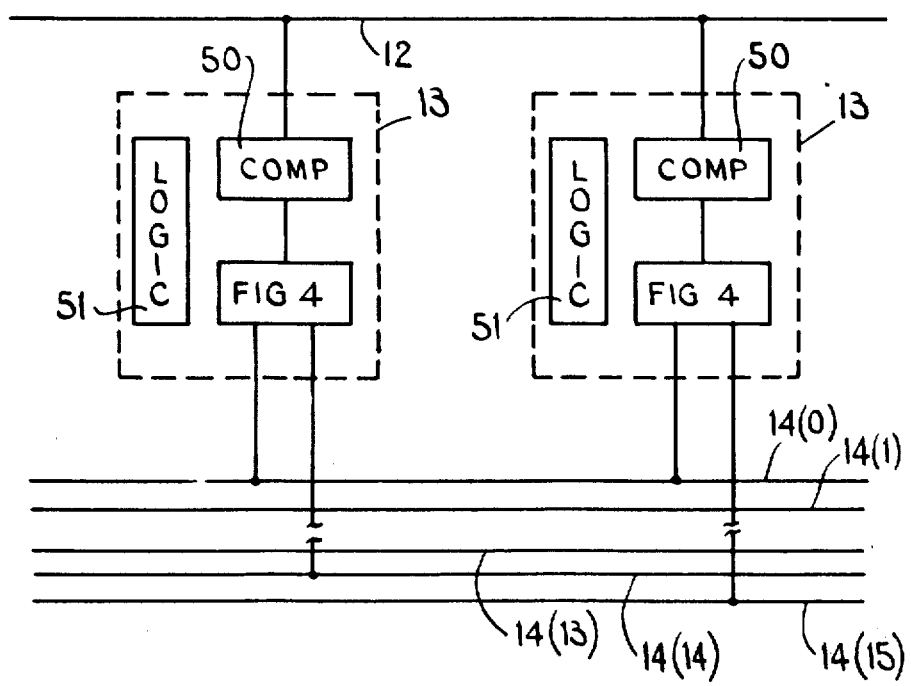
FIG. 5 is a more detailed schematic diagram of part of the system.

The manner in which this address is wired in to the unit will be described below. When the CPU 11 requires to gain access to a particular one of the units 13, in order to read information from or write information into that unit, the CPU places the address of that unit on the highway 12. Each unit contains a comparator 50 (see also FIG. 5) which compares this address with the address allocated to the unit. In FIG. 5 the rectangular box identified as logic 51 is intended to indicate generally the fact that the units 13 include various logic circuits which are of a conventional kind and which enable the units 13 to operate in accordance with design requirements. Since the operation of these logic circuits form no part of the invention detailed description has not been thought necessary. The one of the units which detects identity between these addresses will respond by bringing into play the logic 51 of the unit and exchanging data with the CPU over the highway 12 as required. This method of addressing is, of course, well known, and the details of the necessary circuitry within the CPU and the units 13 for performing this will therefore not be described.

The manner in which information such as functional unit identifiers are hard-wired in to the units 13 will now be described. For this purpose, sixteen distribution lines 14(0) to 14(15) — see also FIG. 5 — are provided, respectively carrying different repetitive waveorms W0–W15. These waveforms are produced by a waveform generator circuit 15.

Figure 2:
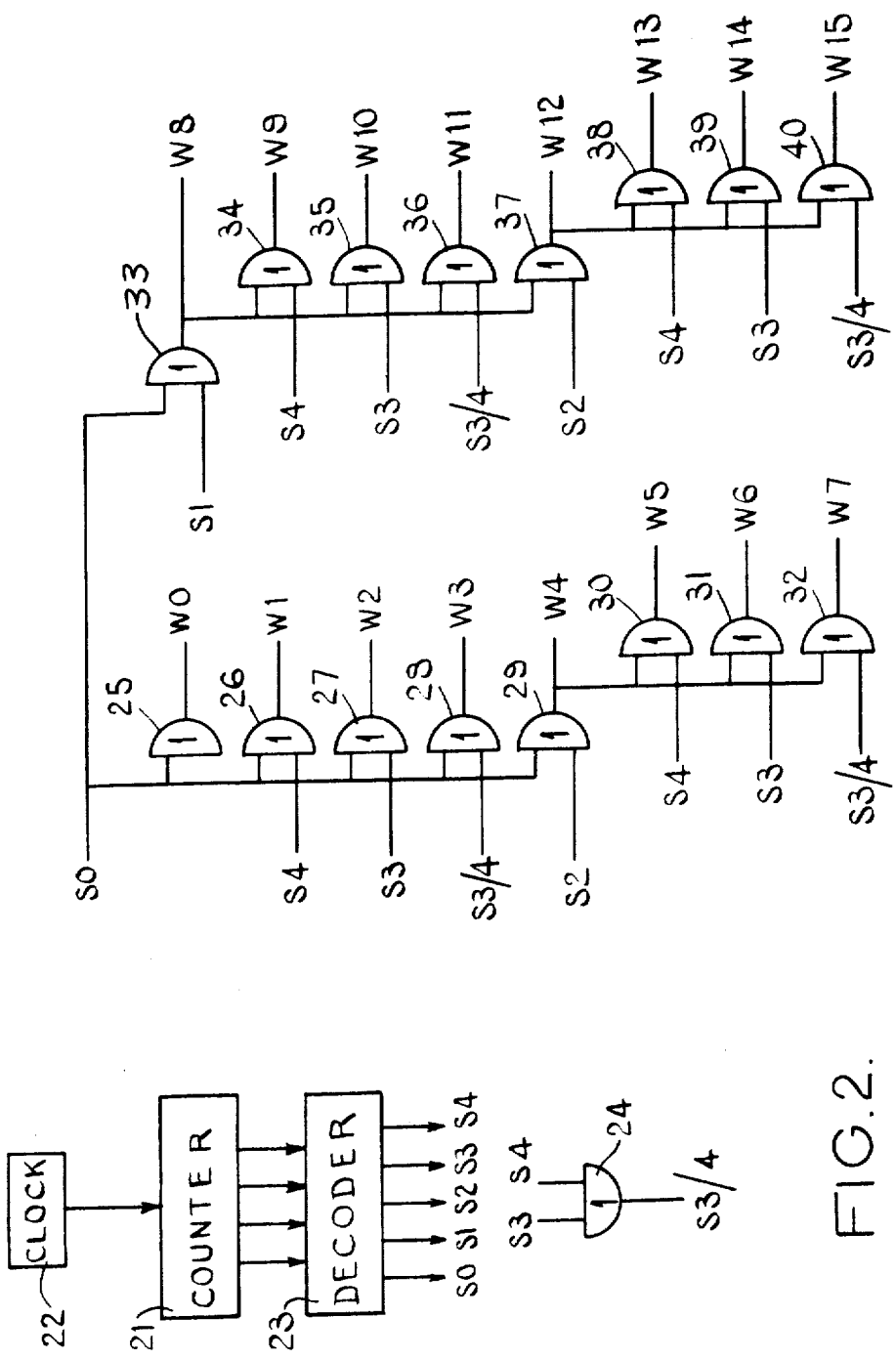
FIG. 2 is a logic circuit diagram of a waveform generator forming part of the system.
Figure 3:
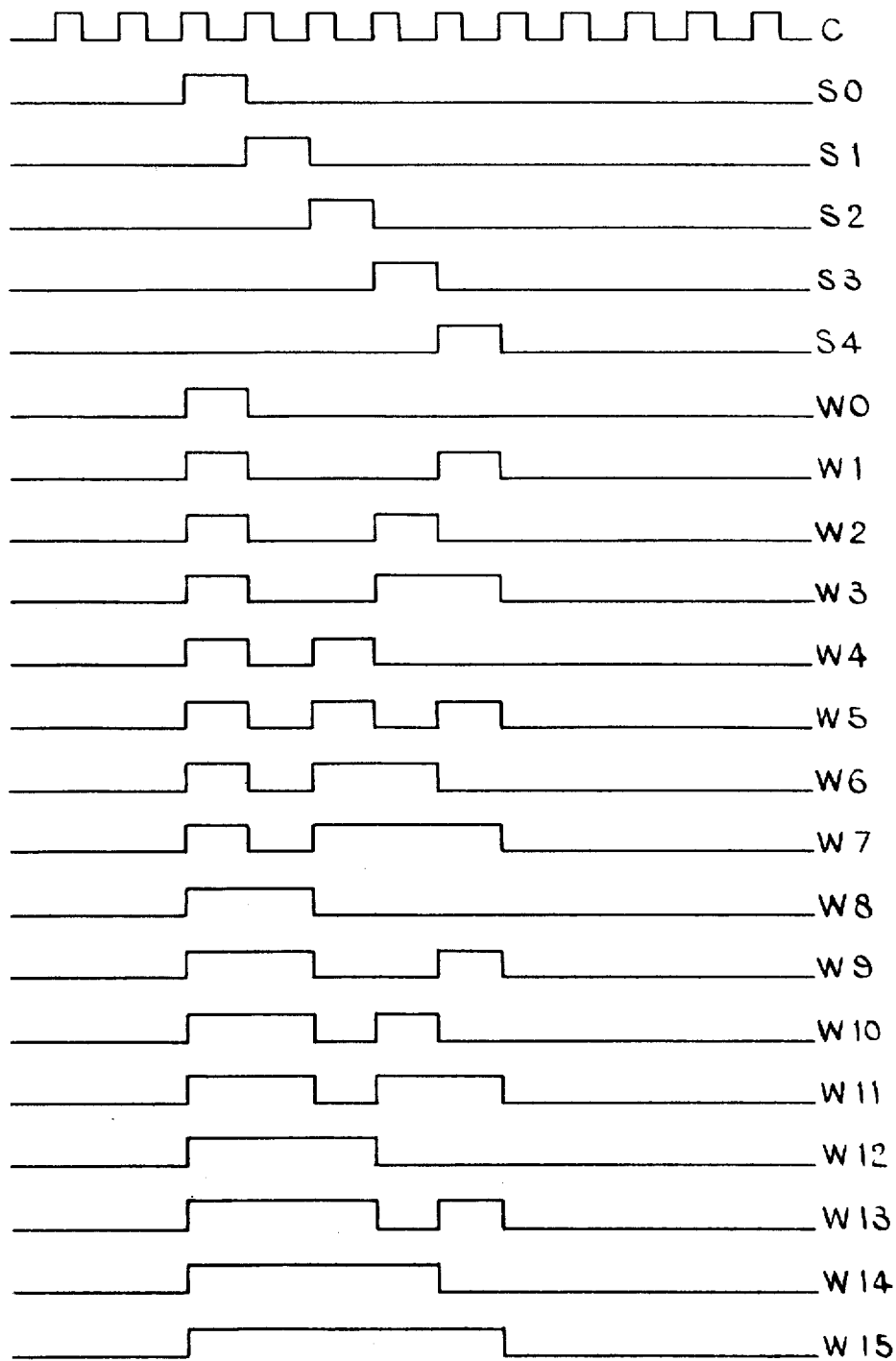
FIG. 3 is a schematic diagram showing the waveforms produced by the waveform generator.

Referring to FIG. 2, the waveform generator circuit includes a four-bit counter 21, which is clocked by a regular sequence of clock pulses C from a CLOCK 22 (see also FIG. 3). The counter thus repeatedly runs through a cycle of 16 clock periods, referred to herein as periods 0–15. In each cycle, the counter counts from 0 up to 15, being then reset to 0 again for the next cycle. The output from the counter 21 is applied to a decoder 23, having five outputs S0–S4. In clock period 0, a binary "1" is produced on output S0, the other four outputs all being zero; in clock period 1, a binary "1" is produced on output S1, the other four all being zero and so on up to period 4. In the other clock periods 5–15, the outputs S0–S4 are all zero.

The two outputs S3 and S4 are combined in an OR gate 24 to produce a further output signal S3/4. These outputs S0-S4 aND S3/4 are then combined in sixteen OR gates 25–40, as shown in FIG. 2, to produce the sixteen waveforms W0–W15.

The sixteen waveforms W0–W15 so produced are shown in FIG. 3, which also shows the clock pulses C and the five outputs S0–S4 of the decoder 23. It will be apparent that each waveform will repeat itself once in each sixteen-period clock cycle.

As will be seen from FIG. 3, each waveform comprises a binary "1" (i.e. a "high" voltage) in clock period 0, which will be referred to as the start bit, followed by four binary digits in periods 1–4, which will be referred to as the indentifier bits. The waveforms each contain a different combination of identifier bits, from 0000 (waveform W0) up to 1111 (waveform W15). In all the other periods of the cycle, each of the waveforms W0–W15 is at zero level. It will be seen that four zeros, followed by the start bit "1" can thus be used as a synchronisation pattern to detect the position of the identifier bits.

There are 16 clock pulses per cycle because it is convenient for the number of clock pulses to be the next power of 2 greater than the number of start and identifier bits.

Referring to FIG. 1 again, each of the units 13 has two terminals 16, 17. When the digital data processing system is assembled, each of the terminals 16 and 17 is wired to one of the distribution lines 14 selected so as to receive the desired one of the waveforms W0–W15 according to the address which is to be allocated to that unit. For example, if a unit is to be allocated the binary address 10101101, terminal 16 will be connected to the distribution wire carrying W10 (containing identifier bits 1010) and terminal 17 will be connected to the wire carrying W13 (containing identifier bits 1101).

Each unit 13 contains a waveform decoder circuit for deriving the four identifier bits from each waveform. The eight bits so derived will then be stored and compared with addresses on the highway 12 as previously described.

Referring now to FIG. 4, the waveform decoder circuit comprises an eight-stage shift register 41, a four-stage buffer register 42, a three-stage shift register 43, and a four-stage buffer register 44. Each of the registers may conveniently be formed from D-type bistables connected in series.

The waveform on terminal 16 is clocked into the shift register 41, by means of the clock signal C from the clock 22, so that at any given time the register 41 will contain the states of the waveform during the last eight clock periods. The occurrence of the synchronisation pattern (four zeros followed by the start bit "1") in the last five stages of the register 41 is detected by means of an AND gate 45, which has four inverting inputs fed from the last four stages of the register 41 and a normal input fed from the fourth stage of the register.

The presence of the synchronisation pattern in these last five stages signifies that the first three stages contain the first three identifier bits, and that the fourth identifier bit is currently present at the terminal 16. The output of the AND gate 45 is therefore used to clock these four identifier bits into the buffer register 42.

The waveform on terminal 17 is clocked into the shift register 43 by the clock signal C. This register has only three stages, since it is not necessary to detect the synchronisation pattern again, this having already been done by gate 45. The presence of the synchronisation pattern in the last three stages of register 41 signifies that the register 43 contains the first three identifier bits of the waveform applied to terminal 17, and that the fourth identifier bit is currently present at that terminal. The output of AND gate 45 is therefore used to clock these four identifier bits into the buffer register 44.

Thus, it will be seen that the registers 42, 44 between them contain the eight-bit identifying address allocated to the unit, for comparison with addresses on the highway 12. This identifying address is wired into the unit using only two terminals 16, 17, compared with the eight terminals which would have been required if the address had been wired in by known methods.

Once the registers 42 and 44 contain the identifying address their contents will not change unless the waveform supplied to the terminals is altered, for example by changing the distribution lines to which they are connected. Since the units 13 include the registers 42, and 44 it follows that once the waveforms have been applied to the units 13 and have been decoded and stored in the registers the latter will retain the decoded signals. In other words the operation of the waveform generator can be continuous or sequentially on during an initial identifying address assignment time period depending upon mere convenience of operation.

It should be appreciated that while in the embodiment of the invention described above the information wired into the units is an identifying address, in other embodiments of the invention other identifying information may be similarly wired in. For example, information may be wired in which will specify the mode of operation of the units, or which will allocate a certain status to the units.

I claim:

1. A system for hard-wiring information into large scale integrated circuit elements each of said elements including at least two terminals for receiving the hard-wired information, the system comprising; (a) waveform generating means for producing a plurality of different waveforms each of which represents a plurality of binary information digits, (b) a group of waveform distribution lines connected to receive respective ones of said waveforms from the generating means; (c) hard-wired connections between the terminals of each of said elements and different combinations of the waveform distribution lines to effect the application to each terminal of each of said elements of one of said waveforms, whereby each of said elements receives a unique multi-digit representation consisting of the different digit representations which are applied to each of the respective terminals; deriving means in each of said elements for decoding said applied waveforms to obtain said binary information digits for establishing in each of said elements an identified code characteristic of the binary information digits hard-wired into said terminals.

2. A hard-wiring system as claimed in claim 1 and further including
 I. a further signal communication line;
 II. a further terminal on each of said elements; each said further terminal being connected to the further communication line;
 III. means for generating element identification signals;
 IV. a comparator means in each of said elements;
 V. a first input to each comparator means, each of said first inputs being connected to the further communication line to receive the identification signals; and
 VI. a second input to each comparator means connected to receive the hard-wiring binary information digits decoded by the deriving means, said comparator means serving to detect correspondence between the identification signals and the hard-wired binary information digits.

3. A hard-wiring system as claimed in claim 2 in which the waveform generating means includes means for generating a synchronisation pattern which is applied to all of the communication lines and a cyclic repetative pattern of the information waveforms that are applied one to each of the communication lines; and in which each one of the deriving means includes
 a. a shift register for receiving the output from the waveform generating means;
 b. a buffer register whose output is connected to the second input of the associated comparator means, and
 c. means responsive to the presence of the synchronisation pattern at a predetermined position in the shaft register to transfer the binary information digits at the shift register into the buffer register.

4. A hard-wiring system as claimed in claim 3, and further including for each of said terminals additional to the first such terminal
 a. a further shift register which is connected to receive the waveform applied to the associated terminal,
 b. a further buffer register whose output is connected to the comparator means second input, and
 c. a control connection between the means responsive to the presence of the synchronisation pattern to transfer the derived binary information digits of the further shift register into said further buffer register.

5. A system for hard-wiring information into large scale integrated circuit elements each of said elements including at least one terminal for receiving the hard-wired information, the system comprising
 a. waveform generating means for cyclically producing a synchronisation pattern, and a plurality of different information waveforms, each of which has a fixed pattern representing a plurality of binary information digits,
 b. a group of waveform distribution lines each connected to receive the synchronisation pattern, and each connected to receive respective ones of the information waveforms,
 c. hard-wired connections between the terminals of each of said elements and different combinations of the waveform distribution lines to effect the application to each terminal of each of said elements of one of said waveforms, whereby each of said elements receives a unique multi-digit representation consisting of the digit representations which are applied to each of the respective terminals,
 d. a further distribution line common to each of said elements for enabling application of data signals to all of the elements,
 e. deriving means in each of said elements for decoding said applied waveforms to obtain said binary information digits for establishing in each of said elements an identifier code characteristic of the binary information digits hard-wired to said terminals, each deriving means including
  1. a shift register, for receiving the output from the waveform generating means;
  2. a buffer register and
  3. means responsive to the preserve of the synchronisation pattern at a predetermined position in the shift register to transfer the binary information digits at the shift register into the buffer register to establish in the buffer register the identifier code and in which the system further comprises
 f. means in each of said elements for effecting a comparison of the contents of the buffer register with the data signals to cause the element to respond to the reception of data signals having a code which corresponds to the identifier code as represented by the buffer register content.

* * * * *